United States Patent
Van den Bogaert et al.

(10) Patent No.: US 7,933,318 B2
(45) Date of Patent: Apr. 26, 2011

(54) CARRIER RE-ACTIVATION IN CASE OF SIGNAL TO NOISE RATIO IMPROVEMENT

(75) Inventors: Etienne André Hubert Van den Bogaert, Schaarbeek (BE); Jeroen Celina Karel Van Elsen, Ekeren (BE)

(73) Assignee: Alcatel, Paris (FR)

( * ) Notice: Subject to any disclaimer, the term of this patent is extended or adjusted under 35 U.S.C. 154(b) by 871 days.

(21) Appl. No.: 10/980,223

(22) Filed: Nov. 4, 2004

(65) Prior Publication Data
US 2005/0124333 A1    Jun. 9, 2005

(30) Foreign Application Priority Data

Dec. 3, 2003   (EP) .................................... 03293024

(51) Int. Cl.
*H04B 1/38*    (2006.01)
*H04B 17/00*    (2006.01)

(52) U.S. Cl. .................. 375/220; 375/227; 455/420
(58) Field of Classification Search .............. 445/420; 375/219, 220, 420; 455/420

See application file for complete search history.

(56) References Cited

U.S. PATENT DOCUMENTS

| | | | |
|---|---|---|---|
| 5,903,608 A | 5/1999 | Chun | |
| 5,956,642 A | 9/1999 | Larsson et al. | |
| 6,452,907 B1 * | 9/2002 | Levin | 370/252 |
| 6,473,394 B1 * | 10/2002 | Marchok et al. | 370/208 |
| 6,751,467 B1 * | 6/2004 | Cameron et al. | 455/516 |
| 2002/0163705 A1 * | 11/2002 | Bakker et al. | 359/239 |
| 2003/0012152 A1 * | 1/2003 | Feldman et al. | 370/316 |
| 2003/0054852 A1 * | 3/2003 | Ginesi et al. | 455/522 |
| 2003/0073435 A1 * | 4/2003 | Thompson et al. | 455/428 |
| 2004/0113814 A1 * | 6/2004 | Lochner | 340/870.18 |
| 2004/0166884 A1 * | 8/2004 | Oh et al. | 455/522 |

FOREIGN PATENT DOCUMENTS

WO    WO 03/041367 A2    5/2003

OTHER PUBLICATIONS

International Telecommunication Union (ITU), Telecommunication Standardization Sector of ITU(ITU-T), G.992.3, Series G: Transmission Systems and Media, Digital Systems and Networks, Digital Sections and digital line system—Access networks, "Asymmetric digital subscriber line (ADSL) transceivers—2(ADSL2)"(Jul. 2002).

* cited by examiner

*Primary Examiner* — David C Payne
*Assistant Examiner* — Brian J Stevens
(74) *Attorney, Agent, or Firm* — Sughrue Mion, PLLC

(57) ABSTRACT

The present invention relates to a first transceiver unit, acting as a receiver unit, and to a second transceiver unit, acting as a transmitter unit. The first transceiver unit measures the signal to noise ratio for each tone, and determine whether a tone shall be shut off, thereby reducing interference on neighboring lines and power consumption. If so, the first transceiver unit keeps on measuring the noise level over that tone. If the ratio of the initially measured signal level to the newly measured noise level exceeds a pre-determined threshold, then the first transceiver unit requests the second transceiver unit to re-activate that tone. A new initialization sequence is transmitted over that tone for initializing the frequency domain equalizer, for measuring the signal to noise ratio, and finally for agreeing on a bit loading.

29 Claims, 3 Drawing Sheets

US 7,933,318 B2

CARRIER RE-ACTIVATION IN CASE OF SIGNAL TO NOISE RATIO IMPROVEMENT

BACKGROUND

1. Field

The present invention relates to a first transceiver unit, acting as a receiver unit with respect to a direction of communication, and a second transceiver unit, acting as a transmitter unit with respect to the same direction of communication, said first transceiver unit comprising:
  a receiver adapted to receive from a physical channel a signal modulated over at least one carrier,
  a channel analyzer coupled to said receiver, and adapted, while an initialization sequence is being transmitted over said at least one carrier, to determine a signal component and a noise component within a frequency interval enclosing one carrier out of said at least one carrier,
  a first communication means adapted to establish a communication link with said second transceiver unit,
  a power remote control unit coupled to said channel analyzer and to said first communication means, and adapted to request said second transceiver unit to shut off said carrier if the ratio of said signal component to said noise component is lower than a first pre-determined threshold, said second transceiver unit comprising:
  a transmitter adapted to transmit over said physical channel a signal modulated over said at least one carrier,
  a second communication means adapted to establish a communication link with said first transceiver unit,
  a power control unit coupled to said transmitter and to said second communication means, and adapted to shut off said carrier upon a first request from said first transceiver unit.

Such a pair of transceiver units is already known in the art, e.g. from the recommendation entitled "*Asymmetric Digital Subscriber Line (ADSL) Transceivers-2 (ADSL2)*", ref. G.992.3, published by the International Telecommunication Union (ITU) in July 2002.

2. Related Art

FIG. 1 depicts a pair of transceiver units with a first Digital Subscriber Line (DSL) transceiver unit TU_C, housed in a Digital Subscriber Line Access Multiplexer (DSLAM) at a central office CO, and a second DSL transceiver unit TU_R, sited at customer premises CP, the transceiver unit TU_C being coupled to the transceiver unit TU_R via a twisted pair of copper wires L.

With respect to the direction of communication from the central office CO to the customer premises CP or downstream direction, the transceiver unit TU_C is a transmitter unit and the transceiver unit TU_R is a receiver unit. With respect to the direction of communication from the customer premises CP to the central office CO or upstream direction, the transceiver unit TU_R is a transmitter unit and the transceiver unit TU_C is a receiver unit.

Transceiver initialization is required in order for a physically connected pair of transceiver units to establish a communication link via a physical channel.

In order to maximize the throughput and reliability of this communication link, a transceiver unit shall determine certain relevant attributes of the physical channel and establish transmission and processing characteristics suitable to that channel.

Each receiver determines the relevant attributes of the channel by means of the transceiver training and channel analysis steps. Determination of channel attribute values and establishment of transmission characteristics requires that each transceiver produces, and appropriately responds to, a specific set of precisely-timed signals.

During a further data exchange step, each receiver shares with its peer transmitter certain transmission settings that it expects to see. Specifically, each receiver communicates the number of bits and relative power level to be used on each carrier.

Upon completion of the initialization procedure, the carriers are sorted as follows (see §8.6.4, p. 76-78):
  Loaded carriers: these are the carriers for which the bit loading is greater than or equal to 1, that is to say the carriers used for communication.
  Monitored carriers: these are the carriers for which the bit loading is set to 0, yet which keep on being transmitted. The purpose is to track the SNR and, in case the SNR improves, to use these carriers for communication.
  Shut-off carriers: these are the carriers that are never used for communication, and for which the bit loading and the relative gain are both set to 0.

A deficiency of the disclosed pair of transceiver units is that the shut-off carriers cannot be enabled again. This means that if the noise conditions change, the transceiver units have to stick with the carriers that are left.

SUMMARY

It is an object of the present invention to provide transceiver units with a more flexible design, which enables to re-activate a shut-off carrier if the noise conditions on that carrier improve.

According to the invention, this object is achieved due to the fact that said channel analyzer is further adapted, after said carrier has been shut off, to determine a pure-noise component within said frequency interval, and that said power remote control unit is further adapted to request said second transceiver unit to re-activate said carrier if the ratio of said signal component to said pure-noise component is higher than a second predetermined threshold, and due to the fact that said power control unit is further adapted to power up said carrier upon a second request from said first transceiver unit, and that said transmitter is further adapted thereupon to transmit an initialization sequence over said carrier.

The basic idea is to shut off the carriers which are not used after the initialization, thereby reducing interference on neighboring lines and power consumption, yet to remember the measured signal level during initialization.

The noise can be monitored on those carriers as it is a pure-noise measurement.

The noise measurements together with the initially measured signal level can point out if a shut off carrier can be re-used.

An initialization sequence shall be triggered over the carriers that have been re-enabled, while user data keep on being transmitted on the loaded carriers. This is necessary for initializing the Frequency domain EQualizer (FEQ), for measuring the Signal to Noise Ratio (SNR), and finally for agreeing on a bit loading over those carriers.

The signal and noise components can be characterized by any of the following attributes:
  the average signal and noise amplitude,
  the average signal and noise power.

The signal and noise components can be determined in the time domain, or in the frequency domain by means of a Fourier expansion.

The scope of the present invention is not limited to DSL transceiver units. The present invention is applicable to whatever type of digital transceiver unit receiving or transmitting data over a discrete set of carriers, being by means of Discrete Multi-Tones (DMT) modulation, Single Carrier (SC) modulation, Code Division Multiple Access (CDMA) modulation, etc, and to whatever type of physical transmission medium, being coaxial cables, optical fibers, the atmosphere, the empty space, etc.

Further characterizing embodiments of the present invention are mentioned in the appended claims.

It is to be noticed that the term 'comprising', also used in the claims, should not be interpreted as being restricted to the means listed thereafter. Thus, the scope of the expression 'a device comprising means A and B' should not be limited to devices consisting only of components A and B. It means that with respect to the present invention, the relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF EXEMPLARY EMBODIMENTS

Figure 1:
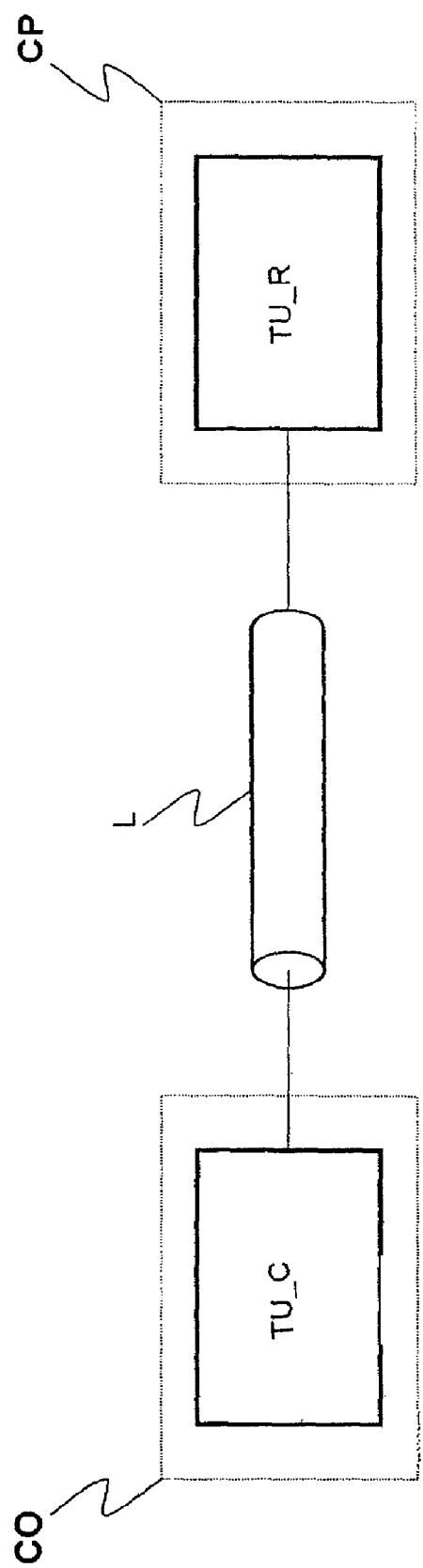
FIG. 1 illustrates a pair of transceiver units.

In a preferred embodiment of the present invention, the transceiver units TU1 and TU2 are ADSL transceiver units.

The first transceiver unit TU1 comprises the following functional blocks:
- a transmitter TX1,
- a receiver RX1,
- a hybrid circuit H1,
- a line adaptator T1,
- a communication means COM1,
- a channel analyzer ANAL,
- a power remote control unit PRCU.

The transmitter TX1 and the receiver RX1 are both coupled to the hybrid circuit H1. The hybrid circuit H1 is coupled to the line adaptator T1. The communication means COM1 is coupled to both the transmitter TX1 and the receiver RX1. The channel analyzer ANAL is coupled to the receiver RX1. The power remote control unit PRCU is coupled to both the channel analyzer ANAL and the communication means COM1.

The second transceiver unit TU2 comprises the following functional blocks:
- a transmitter TX2,
- a receiver RX2,
- a hybrid circuit H2,
- a line adaptator T2,
- a communication means COM2,
- a power control unit PCU.

The transmitter TX2 and the receiver RX2 are both coupled to the hybrid circuit H2. The hybrid circuit H2 is coupled to the line adaptator T2. The communication means COM2 is coupled to both the transmitter TX2 and the receiver RX2. The power control unit PCU is coupled to both the transmitter TX2 and the communication means COM2.

The transmitters TX1 and TX2 accommodate the necessary means for encoding user and control data, and for modulating DSL tones with the so-encoded data.

The transmitter unit TX2 further accommodates the necessary means for tuning the transmit power of each tone, upon control from the power control unit PCU, and as initially determined by the power remote control unit PRCU.

The receivers RX1 and RX2 accommodate the necessary means for demodulating a DMT signal, and for decoding user and control data from the so-demodulated signal.

The hybrid circuit H1 is adapted to couple the transmitter unit TX1's output to the twisted pair L, and the twisted pair L to the receiver unit RX1's input. The hybrid circuit H1 accommodates an echo cancellation means to avoid the transmitted unit TX1's signal to couple into the receiver unit RX1's input.

The hybrid circuit H2 is adapted to couple the transmitter unit TX2's output to the twisted pair L, and the twisted pair L to the receiver unit RX2's input. The hybrid circuit H2 accommodates an echo cancellation means to avoid the transmitted unit TX2's signal to couple into the receiver unit RX2's input.

The line adaptator T1 is adapted to isolate the transceiver unit TU1 from the twisted pair L, and to adapt the input and output impedance of the transceiver unit TU1 to the line characteristic impedance.

The line adaptator T2 is adapted to isolate the transceiver unit TU2 from the twisted pair L, and to adapt the input and output impedance of the transceiver unit TU2 to the line characteristic impedance.

The communication means COM1 and COM2 provide data exchange capabilities between the transceiver unit TU1 and the transceiver unit TU2, more specifically between the power remote control unit PRCU and the power control unit PCU. The communication means COM1 and COM2 accommodate the necessary means for checking and guaranteeing message integrity.

The channel analyzer ANAL is adapted, for each tone of the MEDLEY set (see definition of the MEDLEY set §3.23, p. 12 of the cited document):
- to determine a SNR,
- to determine therefrom a bit loading and a relative power gain.

The channel analyzer ANAL proceeds as follows.

Denote the frequency at which the received signal is sampled as $$F_s = \frac{1}{T_s}.$$

Denote the DMT symbol period as $T_c$ (1/4312, 5 seconds for xDSL).

Denote samples of the $i^{th}$ received DMT symbol as $r_i(n)$, and denote its signal and noise components as $s_i(n)$ and $e_i(n)$ respectively:

$$r_i(n)=s_i(n)+e_i(n) \; n=0, 1, \ldots N-1 \quad (1)$$

$$N \times T_s = T_c \quad (2)$$

The noise $e_i$ is assumed to be a zero-mean Additive White Gaussian Noise (AWGN).

Denote the N-point Discrete Fourier Transform (DFT) of the $i^{th}$ DMT symbol as $R_i(k)$, and denote the N-point DFT of its signal and noise components as $S_i(k)$ and $E_i(k)$ respectively:

$$R_i(k) = \sum_{n=0}^{N-1} r_i(n) \cdot e^{-j\frac{2\pi}{N}kn} \; k = 0, 1, \ldots, N-1 \quad (3)$$

$$S_i(k) = \sum_{n=0}^{N-1} s_i(n) \cdot e^{-j\frac{2\pi}{N}kn} \; k = 0, 1, \ldots, N-1 \quad (4)$$

$$E_i(k) = \sum_{n=0}^{N-1} e_i(n) \cdot e^{-j\frac{2\pi}{N}kn} \; k = 0, 1, \ldots, N-1 \quad (5)$$

$$R_i(k) = S_i(k) + E_i(k) \quad (6)$$

The channel analyzer ANAL may use any of the Fast Fourier Transform (FFT) algorithms as known to the skilled person, such as a RADIX-4 FFT algorithm, provided that $\log_2(N)$ is an non-null positive integer (e.g., $N=2^9=512$).

R is a discrete random process with means $m_R$ and variance $\sigma_R^2$ given by:

$$m_R = \epsilon(R) = \epsilon(S) + \epsilon(E) = \epsilon(S) \quad (7)$$

$$\sigma_R^2 = \epsilon(|R-m_R|^2) = \epsilon((R=m_R) \cdot (R-m_R)) = (|R|^2) - 2\epsilon(R) \cdot m_R + |m_R|^2 = \epsilon(|R|^2) - |m_R|^2 \quad (8)$$

where $\epsilon$ denotes the expected operator, and · the scalar product.

We also have:

$$\epsilon(|R|^2) = \epsilon((S+E) \cdot (S+E)) = \epsilon(|S|^2) + 2\epsilon(S) \cdot \epsilon(E) + \epsilon(|E|^2) = \epsilon(|S|^2) + \epsilon(|E|^2) = \epsilon(|S|^2) + \sigma_E^2 \quad (9)$$

Assuming E, and thus R, are ergodic process, one obtains an non-biased estimate of the average received signal and power by time-averaging over a sufficiently high number I of DMT symbols:

$$\varepsilon(R(k)) = m_{R(k)} = \varepsilon(S(k)) = \frac{1}{I}\sum_{i=0}^{I-1} R_i(k) \quad (10)$$

$$\varepsilon(|R(k)|^2) = |m_{R(k)}|^2 + \sigma_{R(k)}^2 = \frac{1}{I}\sum_{i=0}^{I-1} |R_i(k)|^2 \quad (11)$$

The channel analyzer ANAL determines $m_{R(k)}$ during the REVERB sequence, wherein each tone is 4-QAM modulated with identical binary symbols, and wherein the signal component S stays at a fixed location, thereby has a constant amplitude.

The channel analyzer ANAL then scales and rotates $R_i(k)$ such that $m_{R(k)}$ matches its expected location in the 4-QAM decoding grid:

$$R'_i(k) = A(k)e^{j\phi(k)} \times R_i(k) \quad (12)$$

$$= \underbrace{A(k)e^{j\phi(k)} \times S_i(k)}_{S'_i(k)} + \underbrace{A(k)e^{j\phi(k)} \times E_i(k)}_{E'_i(k)}$$

$$\epsilon(R'(k)) = \epsilon(S'(k)) = A(k)e^{j\phi(k)} \times m_{R(k)} \quad (13)$$

The channel analyzer ANAL determines $\epsilon(|R'(k)|^2)$ during the MEDLEY sequence, wherein each tone is 4-QAM modulated with pseudo random binary symbols, and wherein the amplitude of the signal component S is constant over the symbol space (the 4 constellation points '00', '01', '10' and '11' are located on a circle of radius $A(k) \times |m_{R(k)}|$).

The average signal power for tone k is then given by:

$$\epsilon(|S'(k)|^2) = A(k)^2 \times |m_{R(k)}|^2 \quad (14)$$

The average noise power for tone k is given by:

$$\sigma_{E'(k)}^2 = \epsilon(|R'(k)|^2) - A(k)^2 \times |m_R(k)|^2 \quad (15)$$

The SNR for tone k is given by:

$$SNR(k) = \frac{\varepsilon(|S'(k)|^2)}{\sigma_{E'(k)}^2} = \frac{A(k)^2 \times |m_{R(k)}|^2}{(\varepsilon(|R'(k)|^2) - A(k)^2 \times |m_{R(k)}|^2)} \quad (16)$$

The bit loading over tone k is given by:

$$b(k) = \left\lfloor \log_2\left(1 + \frac{SNR(k)}{\Gamma}\right) \right\rfloor \quad (17)$$

$$= \left\lfloor \log_2\left(1 + \frac{A(k)^2 \times |m_{R(k)}|^2}{\Gamma \times (\varepsilon(|R'(k)|^2) - A(k)^2 \times |m_{R(k)}|^2)}\right) \right\rfloor$$

where:
the SNR-gap is denoted as $\Gamma$,
the nearest integer value lower than or equal to x is denoted as $\lfloor x \rfloor$.

The SNR-gap $\Gamma$ defines the gap between a practical coding and modulation scheme and the channel capacity. The SNR-gap $\Gamma$ depends on the coding and modulation scheme being used, and also on the target probability of error. At theoretical capacity, $\Gamma=0$ dB.

The relative power gain for tone k is given by:

$$g(k) = (2^{b(k)} - 1) \times \frac{\Gamma \times \sigma_{E'(k)}^2}{\varepsilon(|S'(k)|^2)} \quad (18)$$

$$= (2^{b(k)} - 1) \times \frac{\Gamma \times (\varepsilon(|R'(k)|^2) - A(k)^2 \times |m_{R(k)}|^2)}{A(k)^2 \times |m_{R(k)}|^2}$$

Figure 2:
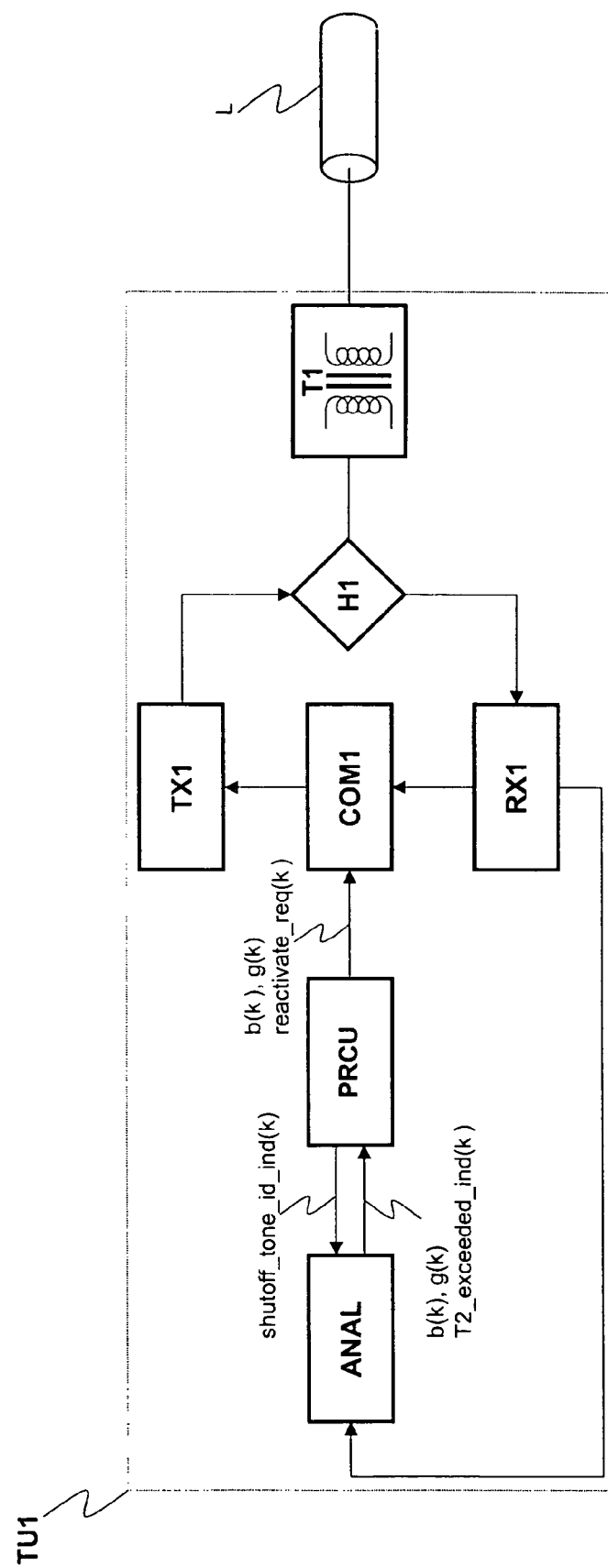
FIG. 2 represents a first transceiver unit TU1 according to the invention.

The channel analyzer ANAL passes the so-determined bit loading b(k) and relative power gain g(k) to the power remote control unit PRCU (see b(k), g(k) in FIG. 2).

The power remote control unit PRCU is adapted to sort the tones of the MEDLEY set as loaded, monitored or shut-off tones.

If the bit loading on a tone k is strictly lower than 1, then the tone k is sorted as a monitored tone or a shut-off tone.

If the SNR on the tone k is still higher than a first threshold T1, the tone k is sorted as a monitored tone, else it is sorted as a shut-off tone.

The identity of the shut-off tones is passed to the channel analyzer ANAL (see shuttoff_tone_id_ind(k) in FIG. 2).

Figure 3:
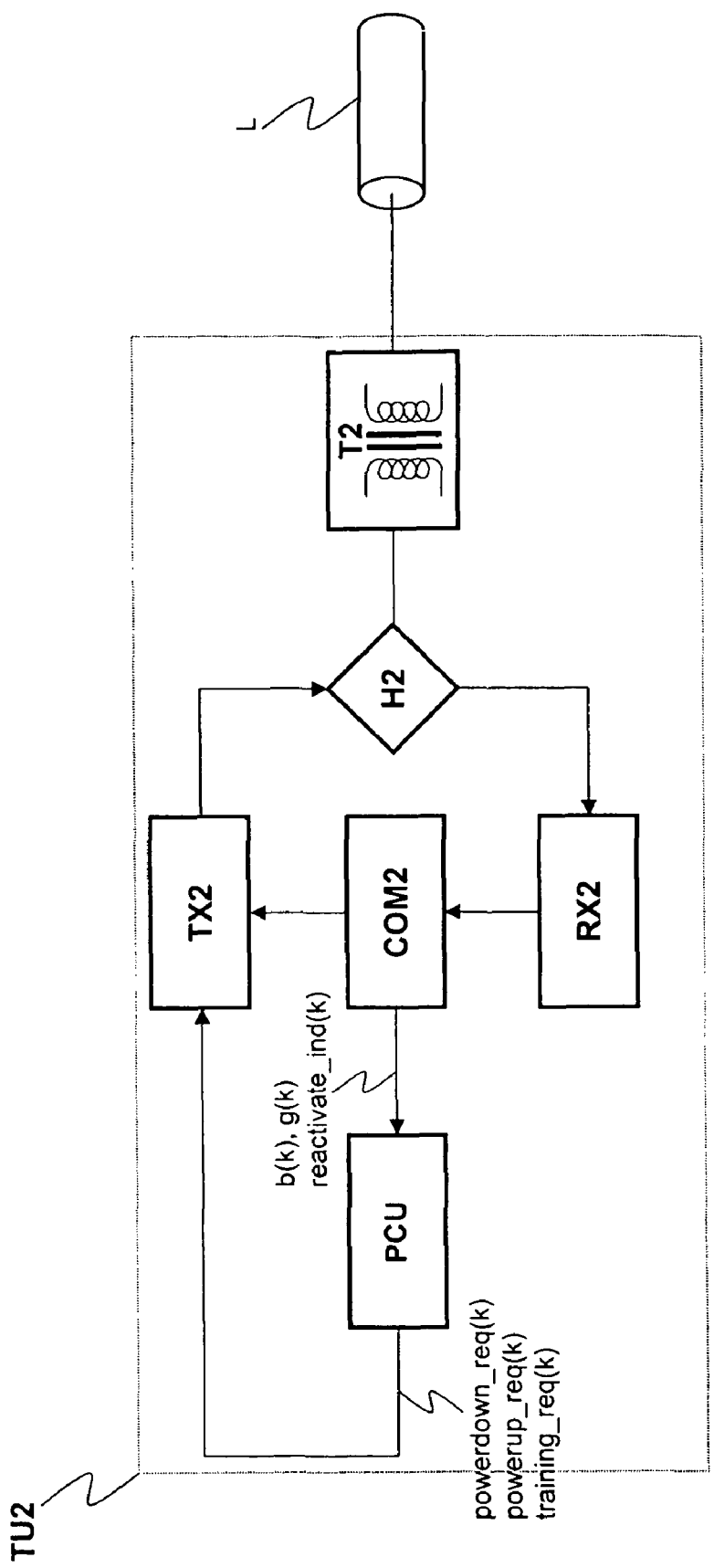
FIG. 3 represents a second transceiver unit TU2 according to the invention.

The power remote control unit PRCU is further adapted to provide the second transceiver unit TU2 with a bit loading and a relative power gain for each tone of the MEDLEY set (see b(k), g(k) in FIGS. 2 and 3). For a monitored tone, the power remote control unit PRCU sets the bit loading to 0 and the relative power gain to a non-null value. For a shut-off tone, the remote power control unit RPCU sets both the bit loading and the relative power gain to 0.

The power control unit PCU is adapted to shut-off a tone, the bit loading and the relative gain of which have been set to 0 by the transceiver unit TU1. The power control unit PCU requests the transmitter TX2 unit to shut-off that tone until further notification (see powerdown_req(k) in FIG. 3).

The channel analyzer ANAL is further adapted, for each shut-off tone of the MEDLEY set:
to keep on measuring the average noise power,
to determine therefrom a virtual SNR,
to compare that virtual SNR to a second threshold T2 at regular time intervals.

The channel analyzer ANAL proceeds as follows.

Denote the attributes related to the showtime period with a double quote.

The virtual SNR is defined as being the ratio of the initial average signal power to the newly measured average noise power:

$$VSNR(k) = \frac{\varepsilon(|S'(k)|^2)}{\sigma_{E'(k)}^2} \qquad (19)$$

$$= \frac{\varepsilon(|S'(k)|^2)}{\varepsilon(|R''(k)|^2) - \underbrace{\varepsilon(|S''(k)|^2)}_{=0}}$$

$$= \frac{\varepsilon(|S'(k)|^2)}{\varepsilon(|R''(k)|^2)}$$

$\varepsilon(|R''(k)|^2)$ is determined during the showtime period by means of equation (11), while $\varepsilon(|S'(k)|^2)$ has been initially determined during transceiver training by means of equations (10) and (14).

If VSNR(k) is higher than T2, then the channel analyzer ANAL triggers the power remote control unit PRCU to re-activate tone k (see T2_exceeded_ind(k) in FIG. 2).

The power remote control unit PRCU is further adapted to request the transceiver unit TU2 to re-activate tone k, by means of a newly defined message, or by means of an existing message with additional information elements (see reactivate_req(k) in FIG. 2 and reactivate_ind(k) in FIG. 3).

The power control unit PCU is further adapted, upon trigger from the transceiver unit TU1:
to request the transmitter TX2 to power up tone k (see powerup_req(k) in FIG. 3),
to trigger the transmission of a new initialization sequence over tone k, restricted to the transceiver training, channel analysis and data exchange steps (see training_req(k) in FIG. 3).

The new bit loading and relative power gain values are determined by the channel analyzer ANAL as previously described, and passed to the transceiver unit TU2 via the communication means COM1 and COM2.

The power control unit PCU tunes the transmit power value of tone k accordingly, and starts transmitting user data over that tone, thereby achieving the object of the present invention.

In an alternative embodiment of the present invention, the average signal and noise powers are determined in the time domain, e.g. by means of a bank of bandpass digital filters centered over each tone, and the bandwidth of which matches the tone spacing $1/T_c$, and next by computing the mean square value of each filter's output.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

What is claimed is:

1. A transceiver unit comprising:
a receiver adapted to receive from a physical channel a signal modulated over at least one carrier,
a channel analysis unit coupled to said receiver, which determines a signal component and a noise component of one carrier out of said at least one carrier within a frequency interval while an initialization sequence is being transmitted over said at least one carrier,
a communication unit which establishes a communication link with a peer transceiver unit,
a power remote control unit coupled to said channel analysis unit and to said communication unit, which requests said peer transceiver unit to shut off said carrier if a ratio of said signal component to said noise component is lower than a first predetermined threshold,
wherein said channel analysis unit determines a pure-noise component of said carrier, within said frequency interval, during said carrier being shut off, by measuring the pure-noise component at said carrier, and
wherein said power remote control unit requests said peer transceiver unit to re-activate said carrier if a ratio of said signal component to said pure-noise component (SNR) is higher than a second predetermined threshold,
wherein said channel analysis unit determines:
an average signal power within said frequency interval, thereby determining said signal component while said initialization sequence is being transmitted over said at least one carrier,
an average noise power within said frequency interval, thereby determining said noise component while said initialization sequence is being transmitted over said at least one carrier, and
wherein said channel analysis unit determines an average pure-noise power within said frequency interval, thereby determining said pure-noise component after said carrier has been shut off.

2. The transceiver unit according to claim 1, wherein said transceiver unit is a digital subscriber line (DSL) transceiver unit.

3. The transceiver unit according to claim 1, wherein another initialization sequence is transmitted over said carrier if said carrier is re-activated.

4. The transceiver unit according to claim 1, wherein a signal is transmitted over said carrier if the carrier is re-activated in addition to signals being transmitted over other carriers out of said at least one carrier.

5. The transceiver unit according to claim 1, wherein each of said at least one carrier is adapted to be classified as a loaded carrier in which bit loading is greater or equal to one, a monitored carrier in which the bit loading is set to zero yet which keep on being transmitted for tracking signal to noise ratio of the respective carrier, and the shut off carrier which is never used for communication and for which the bit loading and relative gain are both set to 0.

6. The transceiver unit according to claim 1, wherein when the carrier is shut off no monitoring data is transmitted.

7. The transceiver unit according to claim 1, wherein each of said at least one carrier is classified as one of a loaded carrier, monitored carrier, and the shut off carrier.

8. The transceiver unit according to claim 1, wherein power control unit sets the bit loading to zero and relative power gain to a non-null value for a monitoring carrier and for the shut-off carrier the bit loading and relative power gain is set to zero.

9. The transceiver unit according to claim 1, wherein said power remote control unit sorts said at least one carrier as one of: a loaded carrier, a monitored carrier, and a shut-off carrier.

10. The transceiver unit according to claim 1, wherein the channel analyzer determines the SNR for each tone.

11. The transceiver unit according to claim 1, wherein the channel analyzer determines the SNR for each carrier in a sampled frequency including shut off carriers that carried data and reactivating the shutoff carriers based on the determined SNR.

12. The transceiver unit according to claim 1, wherein the shut off carriers are carriers that have a relative gain set to zero.

13. The transceiver unit according to claim 1, wherein the shut off carriers are carriers that have a relative gain set to zero and which are configured to be reactivated based on the determined SNR.

14. The transceiver unit according to claim 1, wherein the shut off carriers are carriers that have been shut off after the carriers have been idle, such that no messages were received, for a predetermined time.

15. A transceiver unit comprising:
a transmitter adapted to transmit over a physical channel a signal modulated over at least one carrier,
a communication means adapted to establish a communication link with a peer transceiver unit,
a power control unit coupled to said transmitter and to said communication means, and adapted to shut off a carrier out of said at least one carrier upon a first request from said peer transceiver unit,
wherein said power control unit is further adapted to power up said carrier upon a second request from said peer transceiver unit,
wherein said second request is received from said peer transceiver unit based on a pure-noise component of said carrier, the pure-noise component determined by said peer transceiver unit during said carrier being shut off, by measuring the pure-noise component at said carrier, and
wherein said transmitter is further adapted thereupon to transmit an initialization sequence over said carrier; and
wherein the transceiver determines the SNR for each carrier in a sampled frequency including the shut off carrier that carried data and reactivating the shutoff carriers based on the determined SNR.

16. The transceiver unit according to claim 15, wherein said transceiver unit is a digital subscriber line (DSL) transceiver unit.

17. The transceiver unit according to claim 15, wherein the power control unit shuts off a carrier if a bit loading and a relative gain have been set to 0 by said peer transceiver unit.

18. The transceiver unit according to claim 15, wherein the power control unit tunes a transmit power value of a carrier based on information received from said peer transceiver unit.

19. The transceiver unit according to claim 15, wherein said power control unit sorts said at least one carrier as one of: a loaded carrier, a monitored carrier, and a shut-off carrier.

20. The transceiver unit according to claim 15, wherein said carrier is adapted to be classified as a loaded carrier in which bit loading is greater or equal to one, a monitored carrier in which the bit loading is set to zero yet which keep on being transmitted for tracking signal to noise ratio of the respective carrier, and the shut off carrier which is never used for communication and for which the bit loading and relative gain are both set to 0.

21. The transceiver unit according to claim 15, wherein the shut off carrier is a carrier that has a relative gain set to zero.

22. The transceiver unit according to claim 15, wherein the shut off carrier is a carrier that has been shut off after the carrier has been idle, such that no messages were received, for a predetermined time.

23. A transceiver unit comprising:
a receiver adapted to receive from a physical channel a signal modulated over at least one carrier,
a channel analysis unit coupled to said receiver, which determines a signal component and a noise component of one carrier out of said at least one carrier within a frequency interval while an initialization sequence is being transmitted over said at least one carrier,
a communication unit which establishes a communication link with a peer transceiver unit,
a power remote control unit coupled to said channel analysis unit and to said communication unit, which requests said peer transceiver unit to shut off said carrier if a ratio of said signal component to said noise component is lower than a first predetermined threshold,
wherein said channel analysis unit determines a pure-noise component of said carrier, within said frequency interval, during said carrier being shut off, by measuring the pure-noise component at said carrier,
wherein said power remote control unit requests said peer transceiver unit to re-activate said carrier if a ratio of said signal component to said pure-noise component (SNR) is higher than a second predetermined threshold,
wherein the channel analysis unit determines the SNR for each carrier of a MEDLEY set, and
wherein the channel analysis unit determines a bit loading and relative power gain based on the SNR.

24. A transceiver unit comprising:
a receiver adapted to receive from a physical channel a signal modulated over at least one carrier,
a channel analysis unit coupled to said receiver, which determines a signal component and a noise component of one carrier out of said at least one carrier within a frequency interval while an initialization sequence is being transmitted over said at least one carrier,
a communication unit which establishes a communication link with a peer transceiver unit,
a power remote control unit coupled to said channel analysis unit and to said communication unit, which requests said peer transceiver unit to shut off said carrier if a ratio of said signal component to said noise component is lower than a first predetermined threshold,
wherein said channel analysis unit determines a pure-noise component of said carrier, within said frequency interval, during said carrier being shut off,
wherein said power remote control unit requests said peer transceiver unit to re-activate said carrier if a ratio of said signal component to said pure-noise component (SNR) is higher than a second predetermined threshold, wherein the channel analysis unit determines the SNR for each carrier of a MEDLEY set, wherein the channel analysis unit determines a bit loading and relative power gain based on the SNR, wherein the power remote control unit receives the bit loading and the relative power gain from the channel analysis unit, and wherein the power remote control unit sorts carriers of the MEDLEY as one of: a loaded carrier, a monitored carrier, and a shut-off carrier.

25. The transceiver unit according to claim 24, wherein if the bit loading of the carrier of the MEDLEY is lower than 1, the carrier is sorted as one of: the monitored carrier, and the shut-off carrier.

26. The transceiver unit according to claim 25, wherein if a carrier is the monitored carrier, the power remote control unit sets the bit loading to 0 and the relative power gain to a non-null value.

27. The transceiver unit according to claim 25, wherein if a carrier is the shut-off carrier, the power remote control unit sets both the bit loading and the relative power gain to 0.

28. The transceiver unit according to claim 24, wherein for each shut-off carrier, the channel analysis unit measures an average noise power, determines a virtual signal to noise ratio (virtual SNR) from the average noise power, and compares the virtual SNR to a second threshold at regular time intervals.

29. The transceiver unit according to claim 28, wherein the virtual SNR is a ratio of an initial average signal power to the measured average noise power.

* * * * *